(12) United States Patent
Verma et al.

(10) Patent No.: US 10,355,781 B2
(45) Date of Patent: Jul. 16, 2019

(54) LOCATING ASSETS USING AUTO-COMMISSIONED LIGHT FIXTURES IN A LIGHTING SYSTEM

(71) Applicant: Cooper Technologies Company, Houston, TX (US)

(72) Inventors: Rajeev Verma, Troy, MI (US); Michael Nowak, Whitefish Bay, WI (US); Stephanie F. Lee, Ashland, MA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/872,606

(22) Filed: Jan. 16, 2018

(65) Prior Publication Data

US 2018/0205459 A1 Jul. 19, 2018

Related U.S. Application Data

(60) Provisional application No. 62/445,890, filed on Jan. 13, 2017.

(51) Int. Cl.
| | |
|---|---|
| *G09F 13/00* | (2006.01) |
| *H04B 10/40* | (2013.01) |
| *H04B 10/50* | (2013.01) |
| *H04B 10/60* | (2013.01) |
| *H05B 37/02* | (2006.01) |
| *H04B 10/114* | (2013.01) |
| *H04B 10/116* | (2013.01) |

(52) U.S. Cl.
CPC ........ *H04B 10/116* (2013.01); *G09F 13/00* (2013.01); *H04B 10/1143* (2013.01); *H05B 37/0272* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | |
|---|---|---|---|
| 2009/0184648 A1* | 7/2009 | Colak | H05B 33/0863 315/158 |
| 2014/0270798 A1 | 9/2014 | Manahan | |
| 2014/0341588 A1 | 11/2014 | Pederson | |
| 2015/0282282 A1* | 10/2015 | Breuer | H05B 37/0272 315/152 |

* cited by examiner

*Primary Examiner* — Darren E Wolf
(74) *Attorney, Agent, or Firm* — King & Spalding LLP

(57) ABSTRACT

A system for locating an asset can include a first light fixture disposed in a volume of space and having a first transceiver, a first light source, and a first modulation circuit, where the first light source emits a first light output that defines a first line of sight, where the first modulation circuit generates and sends a first VLC signal that is part of the first light output, where a first light fixture location of the first light fixture in the volume of space is previously determined using the first transceiver during an auto-commissioning process. The system can also include a communication device associated with the asset, where the asset is disposed in the volume of space, where the communication device includes a second transceiver, where the second transceiver receives the first VLC signal from the first transceiver.

20 Claims, 5 Drawing Sheets

LOCATING ASSETS USING AUTO-COMMISSIONED LIGHT FIXTURES IN A LIGHTING SYSTEM

CROSS-REFERENCE TO RELATED APPLICATIONS

This application claims priority under 35 U.S.C. § 119 to U.S. Provisional Patent Application Ser. No. 62/445,890, titled "Locating Assets Using Light Fixtures in a Lighting System" and filed on Jan. 13, 2017. The present disclosure is also related to U.S. Provisional Patent Application Ser. No. 62/358,730, titled "Auto-Commissioning of Light Fixtures In a Lighting System" and filed on Jul. 6, 2016, and is also related to U.S. Provisional Patent Application Ser. No. 62/344,499, titled "Asset Tracking Using Visible Light Communication" and filed on Jun. 2, 2016. The entire contents of the foregoing applications are hereby incorporated herein by reference.

TECHNICAL FIELD

The present disclosure relates generally to monitoring systems for locating an asset, and more particularly to systems, methods, and devices for using auto-commissioned light fixtures in a lighting system to locate an asset.

BACKGROUND

Locating an asset within a volume of space can be time-consuming and often inaccurate if done manually. Locating an asset in a volume of space can be important, regardless of whether the asset is a person or a piece of equipment. Similarly, timely information of where an asset is located in a volume of space can be critical, especially in an emergency situation.

SUMMARY

In general, in one aspect, the disclosure relates to a system for locating an asset. The system can include a first light fixture disposed in a volume of space and having a first transceiver, a first light source, and a first modulation circuit, where the first light source emits a first light output that defines a first line of sight, where the first modulation circuit generates and sends a first VLC signal that is part of the first light output, where a first light fixture location of the first light fixture in the volume of space is previously determined using the first transceiver during an auto-commissioning process. The system can also include a communication device associated with the asset, where the asset is disposed in the volume of space, where the communication device includes a second transceiver, where the communication device is within the first line of sight of the first light output sent by the first light fixture at a first time, where the second transceiver receives the first VLC signal from the first transceiver, where the first VLC signal comprises a first identification and the first light fixture location of the first light fixture in the volume of space.

In another aspect, the disclosure can generally relate to a communication device of an asset located in a volume of space. The communication device can include a transceiver for receiving a VLC signal from a light fixture in the volume of space. The communication device can also include a controller communicably coupled to the transceiver. The communication device can further include a sensor communicably coupled to the controller, where the sensor detects the VLC signal sent by the light fixture. The communication device, when within a line of sight of light output sent by the light fixture, can receive the VLC signal from the light fixture, where the VLC signal includes an identification and a light fixture location of the light fixture in the volume of space, where the identification and the light fixture location of the light fixture are previously determined during an auto-commissioning process.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION

Figure 1:
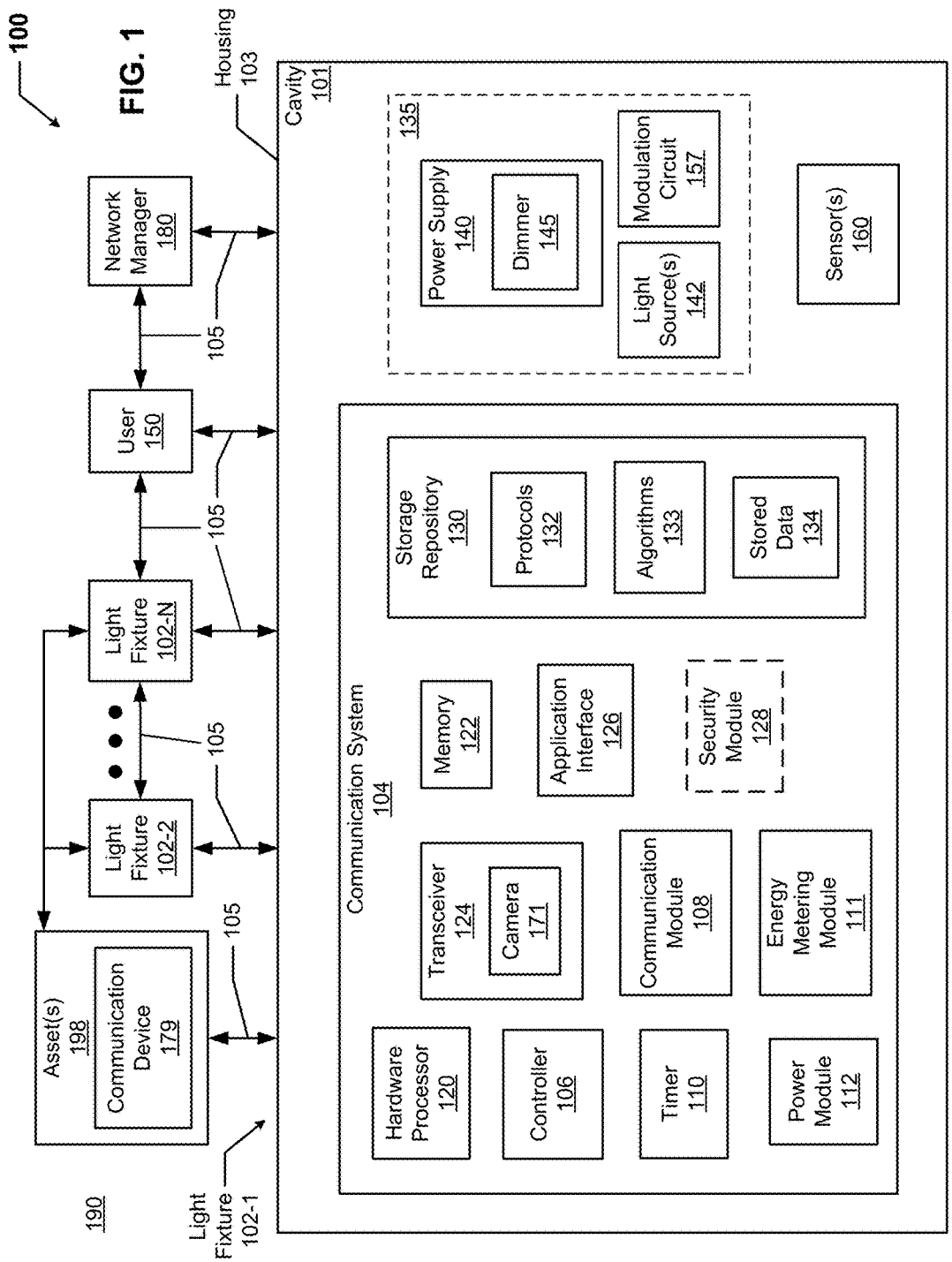
FIG. 1 shows a system diagram of a lighting system that includes a light fixture in accordance with certain example embodiments.

The example embodiments discussed herein are directed to systems, methods, and devices for locating assets using auto-commissioned light fixtures in a lighting system. In some cases, example embodiments may be used with one or more of a number of electrical devices that include a light source but that are not traditionally considered light fixtures. For example, example embodiments can be used with digital thermostats, control panels, exit signs, smoke detectors, a security panel, a surge protector, a fire protection panel, a breaker panel, and a light switch. All of these devices are called light fixtures herein. Further, assets that can be located using example embodiments can include any of a number of devices (e.g., a badge, a cell phone, a personal digital assistant (PDA), a digital camera) that are attached, coupled to, or otherwise associated with an asset (e.g., a person, a vehicle, a piece of equipment). As explained below, such devices are called communication devices herein.

Light fixtures being used to locate an asset can use one or more of a number of different types of light sources, including but not limited to light-emitting diode (LED) light sources, fluorescent light sources, organic LED light sources, incandescent light sources, and halogen light sources. Therefore, light fixtures used in example embodiments described herein should not be considered limited to using a particular type of light source.

In general, example embodiments provide systems, methods, and devices for locating assets using auto-commissioned light fixtures in a lighting system. Example embodiments provide a number of benefits. Such benefits can include, but are not limited to, real-time location information for an asset in a volume of space, improved safety, ease in addressing emergency conditions, and reduced costs and resources for locating an asset. The location information of the asset can be based on an auto-commissioning process of the light fixtures.

The example communication devices and light fixtures (or components thereof, including controllers) capable of locating assets described herein can be made of one or more of a number of suitable materials. Examples of such materials can include, but are not limited to, aluminum, stainless steel, fiberglass, glass, plastic, ceramic, and rubber. Further, such communication devices, light fixtures, and/or other associated components of a system can meet certain standards and/or regulations.

In the foregoing figures showing example embodiments of locating assets using auto-commissioned light fixtures in a lighting system, one or more of the components shown may be omitted, repeated, and/or substituted. Accordingly, example embodiments of locating assets using auto-commissioned light fixtures in a lighting system should not be considered limited to the specific arrangements of components shown in any of the figures. For example, features shown in one or more figures or described with respect to one embodiment can be applied to another embodiment associated with a different figure or description.

In certain example embodiments, light fixtures (or other VLC devices) used for locating assets are subject to meeting certain standards and/or requirements. For example, the National Electric Code (NEC), the National Electrical Manufacturers Association (NEMA), the International Electrotechnical Commission (IEC), the Federal Communication Commission (FCC), the Illuminating Engineering Society (IES), and the Institute of Electrical and Electronics Engineers (IEEE) set standards as to electrical enclosures, wiring, and electrical connections. Use of example embodiments described herein meet (and/or allow a corresponding device to meet) such standards when required.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of locating assets using auto-commissioned light fixtures in a lighting system will be described more fully hereinafter with reference to the accompanying drawings, in which example embodiments of locating assets using auto-commissioned light fixtures in a lighting system are shown. Locating assets using auto-commissioned light fixtures in a lighting system may, however, be embodied in many different forms and should not be construed as limited to the example embodiments set forth herein. Rather, these example embodiments are provided so that this disclosure will be thorough and complete, and will fully convey the scope of locating assets using auto-commissioned light fixtures in a lighting system to those of ordinary skill in the art. Like, but not necessarily the same, elements (also sometimes called components) in the various figures are denoted by like reference numerals for consistency.

Terms such as "first", "second", and "within" are used merely to distinguish one component (or part of a component or state of a component) from another. Such terms are not meant to denote a preference or a particular orientation, and are not meant to limit embodiments of locating assets using auto-commissioned light fixtures in a lighting system. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system diagram of a lighting system 100 that includes a communication system 104 of a light fixture 102-1 in accordance with certain example embodiments. The lighting system 100 can include one or more assets 198, a user 150, a network manager 180, and at least one other light fixture 102 (e.g., light fixture 102-2, light fixture-102-N). An asset 198 can include a communication device 179. In addition to the communication system 104, the light fixture 102-1 can include a lighting circuit 135 and one or more sensors 160 (also sometimes called sensor modules 160 herein). The lighting circuit 135 can include a power supply 140 (which can include an optional dimmer 145), a modulation circuit 157, and one or more light sources 142.

The communication system 104 can include one or more of a number of components. Such components, can include, but are not limited to, a controller 106, a communication module 108, a timer 110, an energy metering module 111, a power module 112, a storage repository 130, a hardware processor 120, a memory 122, a transceiver 124 (which can include an optional camera 171), an application interface 126, and, optionally, a security module 128. The components shown in FIG. 1 are not exhaustive, and in some embodiments, one or more of the components shown in FIG. 1 may not be included in an example light fixture. Any component of the example light fixture 102-1 can be discrete or combined with one or more other components of the light fixture 102-1.

A light fixture 102 (e.g., light fixture 102-1) described herein can be any of a number of different types of light fixtures that use one or more light sources 142 to provide illumination to a user 150. Examples of a light fixture 102 can include, but are not limited to, a troffer light, a spot light, a down can light, an exit sign, an emergency egress light, a digital thermostat, a pendant, a floodlight, a spotlight, a hi-bay, landscape lighting, a street light, a parking lot light, and a digital wall display.

A user 150 may be any person that interacts with light fixtures. Examples of a user 150 can include, but are not limited to, an engineer, an electrician, an instrumentation and controls technician, a mechanic, an operator, a consultant, a network manager 180 (described below), a foreman, a labor scheduling system, a contractor, and a manufacturer's representative. The user 150 can use a user system (not shown), which may include a display (e.g., a GUI). The user 150 interacts with (e.g., sends data to, receives data from) the communication system 104 of the light fixture 102-1 via the application interface 126 (described below).

The user 150 can also interact with a network manager 180 and/or any of the other light fixtures 102 (e.g., light fixture 102-2, light fixture-102-N) in the system 100. Interaction between the user 150 and the light fixtures 102 (or components thereof, such as the communication system 104 and a sensor 160) and/or the network manager 180 is conducted using communication links 105. Each communication link 105 can include wired (e.g., Class 1 electrical cables, Class 2 electrical cables, electrical connectors, power line carrier, DALI, RS485) and/or wireless (e.g., Wi-Fi, visible light communication, cellular networking, Bluetooth, WirelessHART, ISA100) technology. For example, a communication link 105 can be (or include) one or more electrical conductors that are coupled to the housing 103 of a light fixture 102. The communication link 105 can transmit signals (e.g., power signals, communication signals, control signals, data) between one or more light fixtures 102 and the user 150 and/or the network manager 180.

The network manager 180 is a device or component that controls all or a portion of a communication network that includes the communication system 104 of the light fixture 102-1 and the additional light fixtures 102 (including components thereof) that are communicably coupled to the communication system 104. The network manager 180 can be substantially similar to the communication system 104. Alternatively, the network manager 180 can include one or more of a number of features in addition to, or altered from, the features of the communication system 104 described below. As described herein, communication with the network manager 180 can include communicating with one or more other components (e.g., another light fixture 102) of the system 100. In such a case, the network manager 180 can facilitate such communication.

The one or more sensors 160 can be any type of sensing device that measures one or more parameters. Examples of types of sensors 160 can include, but are not limited to, a signal detector, a passive infrared sensor, a photocell, a pressure sensor, and an air flow monitor. A parameter that can be measured by a sensor 160 can include, but is not limited to, a signal, motion, light, and time. In some cases, the parameter or parameters measured by a sensor 160 can be used to commission the light fixture 102-1. In other example embodiments, the parameter or parameters measured by a sensor 160 can be used in visible light communication (VLC).

Each sensor 160 can use one or more of a number of communication protocols. A sensor 160 can be associated with the light fixture 102-1 or another light fixture 102 in the system 100. A sensor 160 can be located within the housing 103 of the light fixture 102-1, disposed on the housing 103 of the light fixture 102-1, or located outside the housing 103 of the light fixture 102-1. In some cases, a single sensor 160 can be shared by more than one light fixture 102. A sensor 160 can be part of, or separate from, the communication system 104. In certain example embodiments, a sensor 160 can include a battery that is used to provide power, at least in part, to some or all of the rest of the sensor 160.

When a sensor 160 is a signal detector, the sensor 160 of the light fixture 102-1 can be used to detect a VLC signal sent from another light fixture 102 and/or from an asset 198. In such a case, the sensor 160 can use one or more of a number of technologies. For example, the sensor 160 can use optical technology to detect a VLC signal within a specific range of acceptance angles. As another example, the sensor 160 can include an angular correction filter so that it can detect a VLC signal, regardless of the angle at which the VLC signal reaches the sensor 160. As yet another example, the sensor 160 can include an ambient light filter so that the sensor 160 detects the VLC signal (e.g., modulated light pattern) from among one or more other sources of light. As still another example, the sensor 160 can include another filter that only allows the sensor 160 to detect certain characteristics of light (e.g., a range of wavelengths) that are part of the VLC signal.

The user 150, the network manager 180, the assets 198, and/or the other light fixtures 102 can interact with the communication system 104 of the light fixture 102-1 using the application interface 126 in accordance with one or more example embodiments. Specifically, the application interface 126 of the communication system 104 receives data (e.g., information, communications, instructions, updates to firmware) from and sends data (e.g., information, communications, instructions) to the user 150, the network manager 180, the assets 198, and/or each other light fixture 102. The user 150, the network manager 180, the assets 198, and/or each other light fixture 102 can include an interface to receive data from and send data to the communication system 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The communication system 104, the user 150, the network manager 180, the assets 198, and/or the other light fixtures 102 can use their own system or share a system in certain example embodiments. Such a system can be, or contain a form of, an Internet-based or an intranet-based computer system that is capable of communicating with various software. A computer system includes any type of computing device and/or communication device, including but not limited to the communication system 104. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, auto-commissioning system software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100. The light fixture 102-1 can include a housing 103. The housing 103 can include at least one wall that forms a cavity 101. In some cases, the housing can be designed to comply with any applicable standards so that the light fixture 102-1 can be located in a particular environment (e.g., a hazardous environment).

The housing 103 of the light fixture 102-1 can be used to house one or more components of the light fixture 102-1, including one or more components of the communication system 104. For example, as shown in FIG. 1, the communication system 104 (which in this case includes the controller 106, the communication module 108, the timer 110, the energy metering module 111, the power module 112, the storage repository 130, the hardware processor 120, the memory 122, the transceiver 124, the application interface 126, and the optional security module 128), the power supply 140, and the light sources 142 are disposed in the cavity 101 formed by the housing 103. In alternative embodiments, any one or more of these or other components of the light fixture 102-1 can be disposed on the housing 103 and/or remotely from the housing 103.

The storage repository 130 can be a persistent storage device (or set of devices) that stores software and data used to assist the communication system 104 in communicating with the user 150, the network manager 180, the assets 198, and one or more other light fixtures 102 within the system 100. In one or more example embodiments, the storage repository 130 stores one or more protocols 132, algorithms 133, and stored data 134. The protocols 132 can be any of a number of communication protocols that are used to send and/or receive data between the communication system 104 and the user 150, the network manager 180, an asset 198, and one or more other light fixtures 102.

One or more protocols 132 can also include a process for auto-commissioning one or more light fixtures 102 in the system 100. One or more protocols 132 can be any of a number of communication protocols that are used to send and/or receive data (e.g., using VLC) between the controller 106, an asset 198, and one or more other light fixtures 102. One or more of the protocols 132 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 132 can provide a layer of security to the data transferred within the system 100.

The algorithms 133 can be any procedures (e.g., a series of method steps), formulas, logic steps, mathematical models, and/or other similar operational procedures that the controller 106 of the communication system 104 follows based on certain conditions at a point in time. An example of an algorithm 133 is identifying (e.g., using one or more of the sensors 160) one or more of the other light fixtures 102 and/or an asset 198, determining (e.g., using an algorithm 133) the distance to each of the other identified light fixtures 102 and/or assets 198, and storing (e.g., using the stored data 134 in the storage repository 130) the measured and calculated data.

Some algorithms 133 can be focused on commissioning (e.g., determining location) of the light fixture 102-1 and the other light fixtures 102 in the system 100. For example, for auto-commissioning, there can be one or more algorithms 133 that calculate a distance from another light fixture (e.g., light fixture 102-2) to the light fixture 102-1 based on the amount of time (e.g., measured by the timer 110) it takes a signal to travel between the light fixtures 102. Other algorithms 133 can be focused on positioning (e.g., determining location) of an asset 198 relative to one or more light fixtures 102 in the volume of space 190. For example, there can be one or more algorithms 133 that calculate a distance from a light fixture 102 to an asset 198 based on the amount of time (e.g., measured by the timer 110) it takes a signal to travel between the asset 198 and the light fixture 102. An algorithm 133 can be fixed or modified (e.g., by a user 150, by the controller 106) over time. Modification of an algorithm 133 can be based on one or more of a number of factors, including but not limited to new equipment (e.g., a new transceiver 124) and correction based on actual data.

Stored data 134 can be any data (e.g., processing speed) associated with the light fixture 102-1 (including other light fixtures 102 and/or any components thereof), the assets 198, any measurements taken by the sensors 160, measurements taken by the energy metering module 111, threshold values, results of previously run or calculated algorithms, and/or any other suitable data. Such data can be any type of data, including but not limited to historical data for the light fixture 102-1, historical data for other light fixtures 102, historical data of the assets 198, calculations, an identification number of a light fixture 102, measurements taken by the energy metering module 111, forecasts, and measurements taken by one or more sensors 160. The stored data 134 can be associated with some measurement of time derived, for example, from the timer 110.

Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the protocols 132, the algorithms 133, and/or the stored data 134 according to some example embodiments. Each storage unit or device can be physically located in the same or in a different geographic location.

The storage repository 130 can be operatively connected to the controller 106. In one or more example embodiments, the controller 106 includes functionality to communicate with the user 150, the network manager 180, the assets 198, and the sensors 160 in the system 100. More specifically, the controller 106 sends information to and/or receives information from the storage repository 130 in order to communicate with the user 150, the network manager 180, the assets 198, and the light fixtures 102. As discussed below, the storage repository 130 can also be operatively connected to the communication module 108 in certain example embodiments.

In certain example embodiments, the controller 106 of the communication system 104 controls the operation of one or more components (e.g., the communication module 108, the timer 110, the transceiver 124) of the communication system 104. For example, the controller 106 can activate the communication module 108 when the communication module 108 is in "sleep" mode and when the communication module 108 is needed to send data received from another component (e.g., another light fixture 102, the user 150) in the system 100.

As another example, the controller 106 can acquire the current time using the timer 110. The real time clock 110 can enable the communication system 104 to control the light fixture 102-1 even when the communication system 104 has no communication with the network manager 180. As yet another example, the controller 106 can direct the energy metering module 111 to measure and send power consumption information of the light fixture 102-1 to the network manager 180. In some cases, the controller 106 of the communication system 104 can generate and send a dimming signal (e.g., 0-10 V DC) to the power supply 140, which causes the power supply 140 to adjust the light output of the light sources 142.

The controller 106 can be configured to perform a number of functions that help automatically commission the light fixture 102-1 (or components thereof) and, in some cases, one or more other light fixtures 102 in the system 100. As discussed above, the controller 106 can execute any of the algorithms 133 stored in the storage repository 130. In certain example embodiments, the controller 106 controls the frequency at which a signal is sent to another light fixture 102 in the system 100.

In certain example embodiments, the controller 106 receives a VLC signal from the transceiver (e.g., transceiver 124), after being notified of the VLC signal by a sensor 160 (e.g., a signal detector), and interprets the VLC signal. The controller 106 uses whatever components (e.g., storage repository 130, hardware processor 120, communication module 108) are necessary to evaluate the VLC signal. In some cases, the controller 106 can also use one more components (e.g., modulation circuit, a light source, the power supply, the transceiver) of a communication device 179 (explained in more detail below with respect to FIGS. 4 and 5) of an asset 198 to send one or more VLC signals to one or more light fixtures 102.

In certain example embodiments, the controller 106 of the communication system 104 includes analytical and mapping tools that allow a VLC signal sent by a light fixture 102 to be received and analyzed so that an asset can be identified and located. The communication module 108 of the controller 106 determines and implements a communication protocol (e.g., from protocols 132 stored in the storage repository 130) that is used when the controller 106 communicates with (e.g., sends VLC or other signals to, receives VLC or other signals from) another light fixture 102 and/or an asset 198.

The controller 106 can provide control, communication, and/or other similar signals to the user 150, the network manager 180, the assets 198, and one or more of the light fixtures 102. Similarly, the controller 106 can receive control, communication, and/or other similar signals from the user 150, the network manager 180, the assets 198 and one or more of the light fixtures 102. The controller 106 can control each sensor 160 automatically (for example, based on one or more algorithms stored in the controller 106) and/or based on control, communication, and/or other similar signals received from another device through a communication link 105. The controller 106 may include a printed circuit board, upon which the hardware processor 120 and/or one or more discrete components of the communication system 104 are positioned.

In certain embodiments, the controller 106 of the communication system 104 can communicate with one or more components of a system external to the system 100 in furtherance of commissioning the light fixture 102-1 and, in some cases, one or more other light fixtures 102 in the system 100. For example, the controller 106 can interact with an inventory management system by ordering a replacement part for a light fixture 102 that the controller 106 has determined to fail or be failing. As another example, the controller 106 can interact with a workforce scheduling system by scheduling a maintenance crew to repair or replace the light fixture 102-1 (or portion thereof) when the controller 106 determines that the light fixture 102-1 or portion thereof requires maintenance or replacement. In this way, the communication system 104 is capable of performing a number of functions beyond what could reasonably be considered a routine task.

In certain example embodiments, the controller 106 can include an interface that enables the controller 106 to communicate with one or more components (e.g., power supply 140) of the light fixture 102-1. For example, if the power supply 140 of the light fixture 102-1 operates under IEC Standard 62386, then the power supply 140 can have a serial communication interface that will transfer data (e.g., stored data 134) measured by the sensors 160. In such a case, the controller 106 can also include a serial interface to enable communication with the power supply 140 within the light fixture 102-1. Such an interface can operate in conjunction with, or independently of, the protocols 132 used to communicate between the communication system 104 and the user 150, the network manager 180, the assets 198, and the other light fixtures 102.

The controller 106 (or other components of the communication system 104) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

The communication module 108 of the communication system 104 determines and implements the communication protocol (e.g., from the protocols 132 of the storage repository 130) that is used when the controller 106 communicates with (e.g., sends signals to, receives signals from) the user 150, the network manager 180, the assets 198, and/or one or more of the other light fixtures 102. In some cases, the communication module 108 accesses the stored data 134 to determine which communication protocol is used to communicate with the other light fixture 102 associated with the stored data 134. In addition, the communication module 108 can interpret the communication protocol of a communication received by the communication system 104 so that the controller 106 can interpret the communication.

The communication module 108 can send and receive data between the network manager 180, the sensors 160, the other light fixtures 102, and/or the users 150 and the communication system 104. The communication module 108 can send and/or receive data in a given format that follows a particular protocol 132. The controller 106 can interpret the data packet received from the communication module 108 using the protocol 132 information stored in the storage repository 130. The controller 106 can also facilitate the data transfer between one or more sensors 160 and the network manager 180, the other light fixtures 102, and/or a user 150 by converting the data into a format understood by the communication module 108.

The communication module 108 can send data (e.g., protocols 132, algorithms 133, stored data 134, operational information, alarms) directly to and/or retrieve data directly from the storage repository 130. Alternatively, the controller 106 can facilitate the transfer of data between the communication module 108 and the storage repository 130. The communication module 108 can also provide encryption to data that is sent by the communication system 104 and decryption to data that is received by the communication system 104. The communication module 108 can also provide one or more of a number of other services with respect to data sent from and received by the communication system 104. Such services can include, but are not limited to, data packet routing information and procedures to follow in the event of data interruption.

When not in auto-commissioning mode, the communication module 108 can send and receive data between another light fixture 102 and/or an asset 198. The communication module 108 can send and/or receive data in a given format that follows a particular communication protocol (a type of protocol 132). The controller 106 can interpret the data packet received from the communication module 108 using the communication protocol information stored in the storage repository 130. The controller 106 can also facilitate the data transfer between another light fixture 102 and/or an asset 198 by converting the data into a format understood by the communication module 108.

The timer 110 of the communication system 104 can track clock time, intervals of time, an amount of time, and/or any other measure of time. The timer 110 can also count the number of occurrences of an event, whether with or without respect to time. Alternatively, the controller 106 can perform the counting function. The timer 110 is able to track multiple time measurements concurrently. The timer 110 can track time periods based on an instruction received from the controller 106, based on an instruction received from the user 150, based on an instruction programmed in the software for the communication system 104, based on some other condition or from some other component, or from any combination thereof.

The timer 110 can be configured to track time when there is no power delivered to the communication system 104 (e.g., the power module 112 malfunctions) using, for example, a super capacitor or a battery backup. In such a case, when there is a resumption of power delivery to the communication system 104, the timer 110 can communicate any aspect of time to the communication system 104. In such a case, the timer 110 can include one or more of a number of components (e.g., a super capacitor, an integrated circuit) to perform these functions.

The energy metering module 111 of the communication system 104 measures one or more components of power (e.g., current, voltage, resistance, VARs, watts) at one or more points within the light fixture 102-1. The energy metering module 111 can include any of a number of measuring devices and related devices, including but not limited to a voltmeter, an ammeter, a power meter, an ohmmeter, a current transformer, a potential transformer, and electrical wiring. The energy metering module 111 can measure a component of power continuously, periodically, based on the occurrence of an event, based on a command received from the control module 106, and/or based on some other factor.

The power module 112 of the communication system 104 provides power to one or more other components (e.g., timer 110, controller 106) of the communication system 104. In addition, in certain example embodiments, the power module 112 can provide power to the power supply 140 of the light fixture 102-1. The power module 112 can include one or more of a number of single or multiple discrete components (e.g., transistor, diode, resistor), and/or a microprocessor.

The power module 112 may include a printed circuit board, upon which the microprocessor and/or one or more discrete components are positioned. In some cases, the power module 112 can include one or more components that allow the power module 112 to measure one or more elements of power (e.g., voltage, current) that is delivered to and/or sent from the power module 112, Alternatively, the communication system 104 can include a power metering module (not shown) to measure one or more elements of power that flows into, out of, and/or within the communication system 104.

The power module 112 can include one or more components (e.g., a transformer, a diode bridge, an inverter, a converter) that receives power (for example, through an electrical cable) from a source external to the light fixture 102-1 and generates power of a type (e.g., alternating current, direct current) and level (e.g., 12V, 24V, 120V) that can be used by the other components of the communication system 104 and/or by the power supply 140. The power module 112 can use a closed control loop to maintain a preconfigured voltage or current with a tight tolerance at the output. The power module 112 can also protect the rest of the electronics (e.g., hardware processor 120, transceiver 124) in the light fixture 102-1 from surges generated in the line.

In addition, or in the alternative, the power module 112 can be a source of power in itself to provide signals to the other components of the communication system 104. For example, the power module 112 can be a battery. As another example, the power module 112 can be a localized photovoltaic power system. The power module 112 can also have sufficient isolation in the associated components of the power module 112 (e.g., transformers, opto-couplers, current and voltage limiting devices) so that the power module 112 is certified to provide power to an intrinsically safe circuit.

In certain example embodiments, the power module 112 of the communication system 104 can also provide power and/or control signals, directly or indirectly, to one or more of the sensors 160. In such a case, the controller 106 can direct the power generated by the power module 112 to the sensors 160 of the light fixture 102-1. In this way, power can be conserved by sending power to the sensors 160 of the light fixture 102-1 when those devices need power, as determined by the controller 106.

The hardware processor 120 of the communication system 104 executes software, algorithms, and firmware in accordance with one or more example embodiments. Specifically, the hardware processor 120 can execute software on the controller 106 or any other portion of the communication system 104, as well as software used by the user 150, the network manager 180, an asset 198, one or more other light fixtures, 102, and/or one or more of the sensors 160. The hardware processor 120 can be an integrated circuit, a central processing unit, a multi-core processing chip, SoC, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or nonvolatile memory. The memory 122 is discretely located within the communication system 104 relative to the hardware processor 120 according to some example embodiments. In certain configurations, the memory 122 can be integrated with the hardware processor 120.

In certain example embodiments, the communication system 104 does not include a hardware processor 120. In such a case, the communication system 104 can include, for example, one or more field programmable gate arrays (FPGA), one or more integrated-gate bipolar transistors (IGBTs), and/or one or more integrated circuits (ICs). Using FPGAs, IGBTs, ICs, and/or other similar devices known in the art allows the communication system 104 (or portions thereof) to be programmable and function according to certain logic rules and thresholds without the use of a hardware processor. Alternatively, FPGAs, IGBTs, ICs, and/ or similar devices can be used in conjunction with one or more hardware processors 120.

The transceiver 124 of the communication system 104 can send and/or receive control and/or communication signals. Specifically, the transceiver 124 can be used to transfer data between the communication system 104 and the user 150, the network manager 180, an asset 198, one or more other light fixtures 102, and/or the sensors 160. The transceiver 124 can use wired and/or wireless technology. The transceiver 124 can be configured in such a way that the control and/or communication signals sent and/or received by the transceiver 124 can be received and/or sent by another transceiver that is part of the user 150, the network manager 180, an asset 198, one or more other light fixtures 102, and/or the sensors 160. The transceiver 124 can use any of a number of signal types, including but not limited to radio frequency signals.

When the transceiver 124 uses wireless technology, any type of wireless technology can be used by the transceiver 124 in sending and receiving signals. Such wireless technology can include, but is not limited to, Wi-Fi, visible light communication, cellular networking, and Bluetooth. The transceiver 124 can use one or more of any number of suitable communication protocols (e.g., ISA100, HART) when sending and/or receiving signals. Such communication protocols can be stored in the protocols 132 of the storage repository 130. Further, any transceiver information for the user 150, the network manager 180, the assets 198, and/or the sensors 160 can be part of the stored data 134 (or similar areas) of the storage repository 130.

In certain example embodiments, the transceiver 124 is used for commissioning the light fixture 102-1. In addition, or in the alternative, the transceiver 124 can be a device that receives a VLC signal, emitted as part of the light output generated by a light source of a different light fixture. The transceiver 124 can also send a VLC signal, emitted as part of the light output generated by a light source 142 of the lighting circuit 135 of the light fixture 102-1. The transceiver 124 of the light fixture 102-1 can be a stand-alone device that is physically separate from the light fixture 102-1, but within a line of sight of the light emitted from the light source of an adjacent light fixture 102. An example of a transceiver 124 is an optical sensor (e.g., a photocell). The transceiver 124 can search for a light output (and, thus, a VLC signal) on a regular basis (e.g., constantly, every 30 seconds), based on the occurrence of some event (e.g., the start of a piece of equipment), and/or based on some other factor. For example, a transceiver 124 can activate whenever it senses a light signal.

Optionally, in one or more example embodiments, the security module 128 secures interactions between the communication system 104, the user 150, the network manager 180, the assets 198, and/or the sensors 160. More specifically, the security module 128 authenticates communication from software based on security keys verifying the identity of the source of the communication. For example, user software may be associated with a security key enabling the software of the user 150 to interact with the communication system 104 and/or the sensors 160. Further, the security module 128 can restrict receipt of information, requests for information, and/or access to information in some example embodiments.

As mentioned above, aside from the communication system 104 and its components, the light fixture 102-1 can include one or more sensors 160 and a lighting circuit 135. The lighting circuit 135 can include one or more of a number of components. For example, as shown in FIG. 1, the lighting circuit 135 can include a power supply 140 with an optional dimmer 145, a modulation circuit 157, and one or more light sources 142. In certain example embodiments, the power supply 140 and the modulation circuit 157 are both connected in parallel with the light sources 142 to form the lighting circuit 135. In certain embodiments, one or more of a number of other components (e.g., an inductor, a capacitor, a resistor, a switch, an integrated circuit) can be used in the lighting circuit 135 between the power supply 140, the modulation circuit 157, and/or the light sources 142.

The light sources 142 of the light fixture 102-1 are devices and/or components typically found in a light fixture to allow the light fixture 102-1 to operate. The light fixture 102-1 can have one or more of any number and/or type of light sources 142. Examples of such light sources 142 can include, but are not limited to, a local control module, a light source, a light engine, a heat sink, an electrical conductor or electrical cable, a terminal block, a lens, a diffuser, a reflector, an air moving device, a baffle, a dimmer, and a circuit board. A light source 142 can use any type of lighting technology, including but not limited to LED, incandescent, sodium vapor, and fluorescent.

The light sources 142 can emit light output when current flows through the light source 142. Such a light output can include a non-VLC signal component (or, more simply, a non-VLC signal) and, in some embodiments, a VLC signal component (or, more simply, a VLC signal). The light output of the light sources 142 can be detected by a transceiver of one or more adjacent light fixtures 102.

The power supply 140 of the light fixture 102-1 provides power to one or more of the light sources 142 and/or other components of the lighting circuit 135, the sensors 160, and/or the communication system 104 (or any components thereof). The power supply 140 can be called by any of a number of other names, including but not limited to a driver, a LED driver, and a ballast. The power supply 140 can be substantially the same as, or different than, the power module 112 of the communication system 104. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned, and/or a dimmer.

The power supply 140 can include one or more components (e.g., a transformer, a diode bridge, an inverter, a converter) that receives power (for example, through an electrical cable) from the power module 112 of the communication system 104 and generates power of a type (e.g., alternating current, direct current) and level (e.g., 12V, 24V, 120V) that can be used by the light sources 142. In addition, or in the alternative, the power supply 140 can receive power from a source external to the light fixture 102-1. In addition, or in the alternative, the power supply 140 can be a source of power in itself. For example, the power supply 140 can be a battery, a localized photovoltaic power system, or some other source of independent power.

In some cases, the power supply 140 can include a dimmer 145. The optional dimmer 145 of the power supply 140, if included, can control the amount of power (adjusts the power signal) delivered by the power supply 140 to the light sources 142. The dimmer 145 can be controlled remotely by a user 150 and/or by some other source. By controlling the power signal delivered by the power supply 140 to the light sources 142, the dimmer 145 controls the amount of light output by the light sources 142. The dimmer 145 can be part of the power supply 140, or the dimmer 145 can be a separate device from the power supply 140.

The modulation circuit 157 controls the VLC signal component of the light emitted by a light source 142. Specifically, the modulation circuit 157 sends, in parallel with the power signal sent by the power supply 140, a varying amount of power (the visible light signal) to a light source 142. The visible light signal generated by the modulation circuit 157 can be set at a different frequency (e.g., greater than one GHz, greater than one kHz) relative to the frequency (e.g., 120 Hz) of the power signal generated by the power supply 140. The power signal sent by the power supply 140 to a light source 142 is added to the visible light signal sent by the modulation circuit 157 to a light source 142, and the light source 142 emits light based on the sum of the power signal received from the power supply 140 and the visible light signal received from the modulation circuit 157. In such a case, the light emitted by the light source 142 can include a VLC signal component. The modulation circuit 157 can be part of the power supply 140, or the modulation circuit 157 can be a separate device from the power supply 140. As an example, output current of the power supply 140 (e.g., an LED driver) is modulated in the kHz/MHz or GHz range, and data is digitized into that modulated signal by the modulation circuit 157. Additional data could also be embedded in the modulated current signal by varying its modulated frequency.

Variations (e.g., frequency, wavelength, amplitude) in the signal (also called a visible light signal) sent by the modulation circuit 157 to a light source 142 translates directly into the VLC signal as output by the light source 142. In other words, the power signal received by the light source 142 from the power supply 140 is constant, regardless of whether a dimmer 145 is present in the lighting circuit 135. Put another way, the dimmer 145 is used to control the amount of power signal delivered by the power supply 140 to the light source 142, and is not used in the VLC functionality of the modulation circuit 157. In some cases, the VLC signal sent by the modulation circuit 157 can only be sent if the dimmer 145 is set at or above some minimal dimming level. For example, the dimmer 145 can set the intensity of the light source 142 by changing the amplitude of the current. However, the modulated current signal generated by the modulation circuit 157 can still transfer the data even though its DC-offset is less.

In certain example embodiments, the modulation circuit 157 operates at a modulation level, which is the maximum amplitude of the visible light signal sent by the modulation circuit 157 to the light source 142. The modulation level of the modulation circuit 157 is typically a very small amount (e.g., less than 30%) compared to the amplitude of the power signal sent by the power supply 140 to the light source 142. For example, if the power signal delivered by the power supply 140 to the light source 142 is 1.0 A, then the modulation level of the modulation circuit 157 can be less than approximately 20 mA.

If the modulation level of the visible light signal delivered by the modulation circuit 157 to the light source 142 is too large (e.g., greater than approximately 2% of the amplitude of the power signal sent by the power supply 140 to the light source 142), then the light emitted by the light source 142 can have a flicker discernable by the human eye. Thus, because the modulation level generated by the modulation circuit 157 is so low relative to the amplitude of the power signal delivered by the power supply 140 to the light source 142, the signal-to-noise ratio (SNR) of the VLC signal of the light output of the light source 142 can be low.

In certain example embodiments, the controller 106 is communicably coupled to the optional dimmer 145, the modulation circuit 157, the power supply 140, and the transceiver 124. The controller 106 can coordinate and control one or more of the components of the light fixture 102-1. For example, the controller 106 can interpret a VLC signal received by the transceiver 124 and detected by a sensor 160 (e.g., a signal detector). As another example, the controller 106 can manage the power generated by the power supply 140 and distributed to any or all of the other components of the light fixture 102-1. As still another example, the controller 106 can generate and send, using the transceiver 124, a unique identification code through the system 100 so that a communication device 179 (described below with respect to FIGS. 4 and 5) associated with an asset 198 in a volume of space can be identified, located, and tracked.

In certain example embodiments, the transceiver 124 and the modulation circuit 157 are communicably coupled to the controller 106 so that the modulation circuit 157 generates a visible light signal based on a VLC signal received by the transceiver 124. As such, the light fixture 102-1 can act as a relay between other light fixtures 102 in the system 100, as described below with respect to FIG. 4.

In certain example embodiments, when the transceiver 124 receives a VLC signal, the controller 106 instructs the modulation circuit 157 to generate and send a corresponding visible light signal to the light source 142. Similarly, the controller 106 can also initiate, directly or indirectly, the power supply 140 (with or without the dimmer 145) to send a power signal to the light source 142. In certain example embodiments, the controller 106 uses one or more of a number of protocols 132 and/or algorithms 133 to determine, based on a reading from one or more sensors 160 (e.g., signal detectors), a location of an asset 198 in the volume of space 190. Further, the controller 106 can use one or more protocols 132 that are used to communicate a VLC signal within the system 100. Such protocols 132 and/or algorithms 133 can be stored in memory 122 in the communication system 104. Such protocols 132 and/or algorithms 133 can be updated by a user 150, automatically or by some other source, on any random or fixed time interval.

The visible light signal generated by the modulation circuit 157 can come in one or more of a number of formats that conform to a VLC protocol. Examples of such formats can include, but are not limited to, a binary system, frequency, and wavelength. As a specific example, when the modulation level of the modulation circuit 157 is 20 mA, the VLC protocol can operate on a binary system (zeros and ones), and so the visible light signal can be zero (to correspond to a binary zero) or 20 mA (to correspond to a binary one). The VLC protocol can be communicated between, and followed by, the modulation circuit 157, the transceiver 154, and the controller 106 that initiates the VLC signal. The modulation circuit 157 can generate visible light signals that are superimposed with light waves generated by a light source 142 that uses AC or DC power.

As stated above, one or more of the light fixtures 102 can be placed in any of a number of environments. In such a case, the housing 103 of the light fixture 102-1 can be configured to comply with applicable standards for any of a number of environments. For example, the light fixture 102-1 can be rated as a Division 1 or a Division 2 enclosure under NEC standards. Similarly, any of the sensors 160 or other devices communicably coupled to the light fixture 102-1 can be configured to comply with applicable standards for any of a number of environments. For example, a sensor 160 can be rated as a Division 1 or a Division 2 enclosure under NEC standards.

Figure 2:
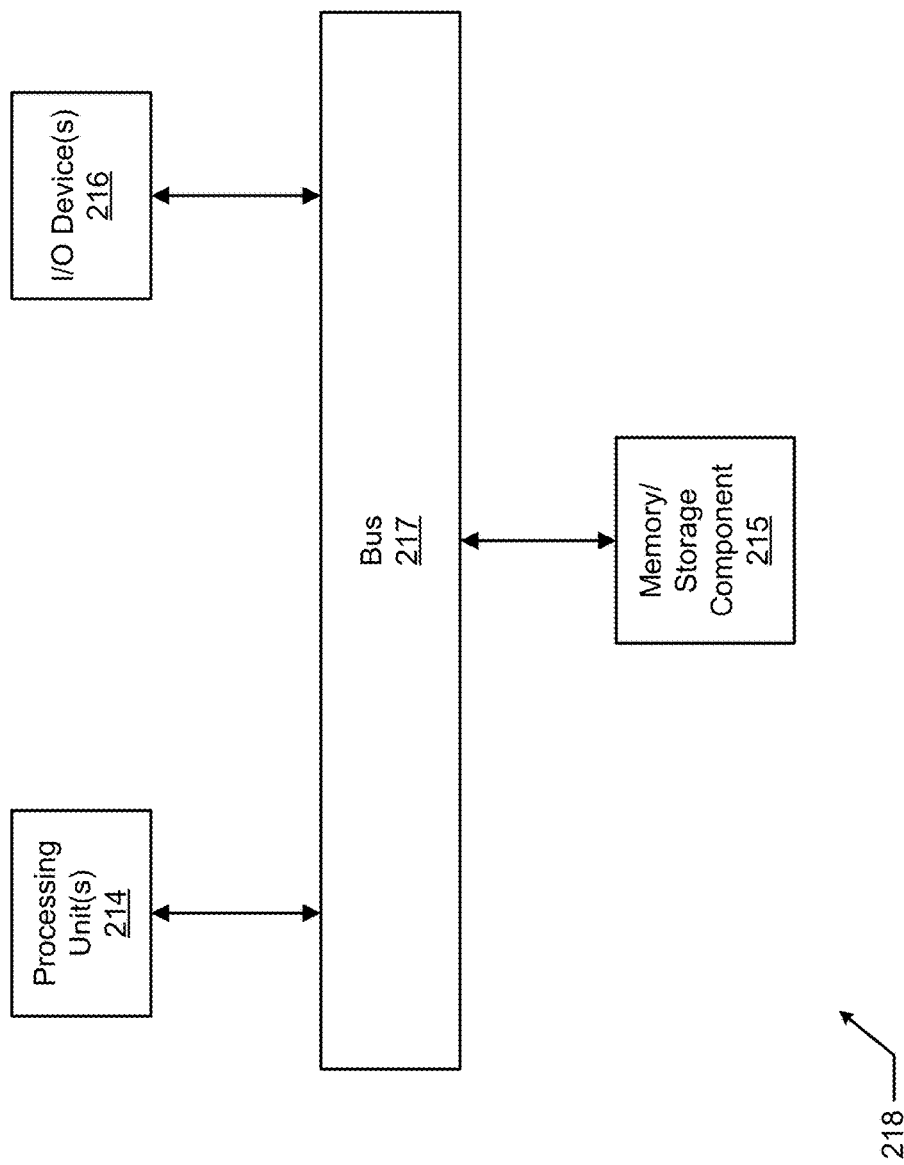
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a LAN, a WAN such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106, transceiver 124, modulation circuit 157) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3:
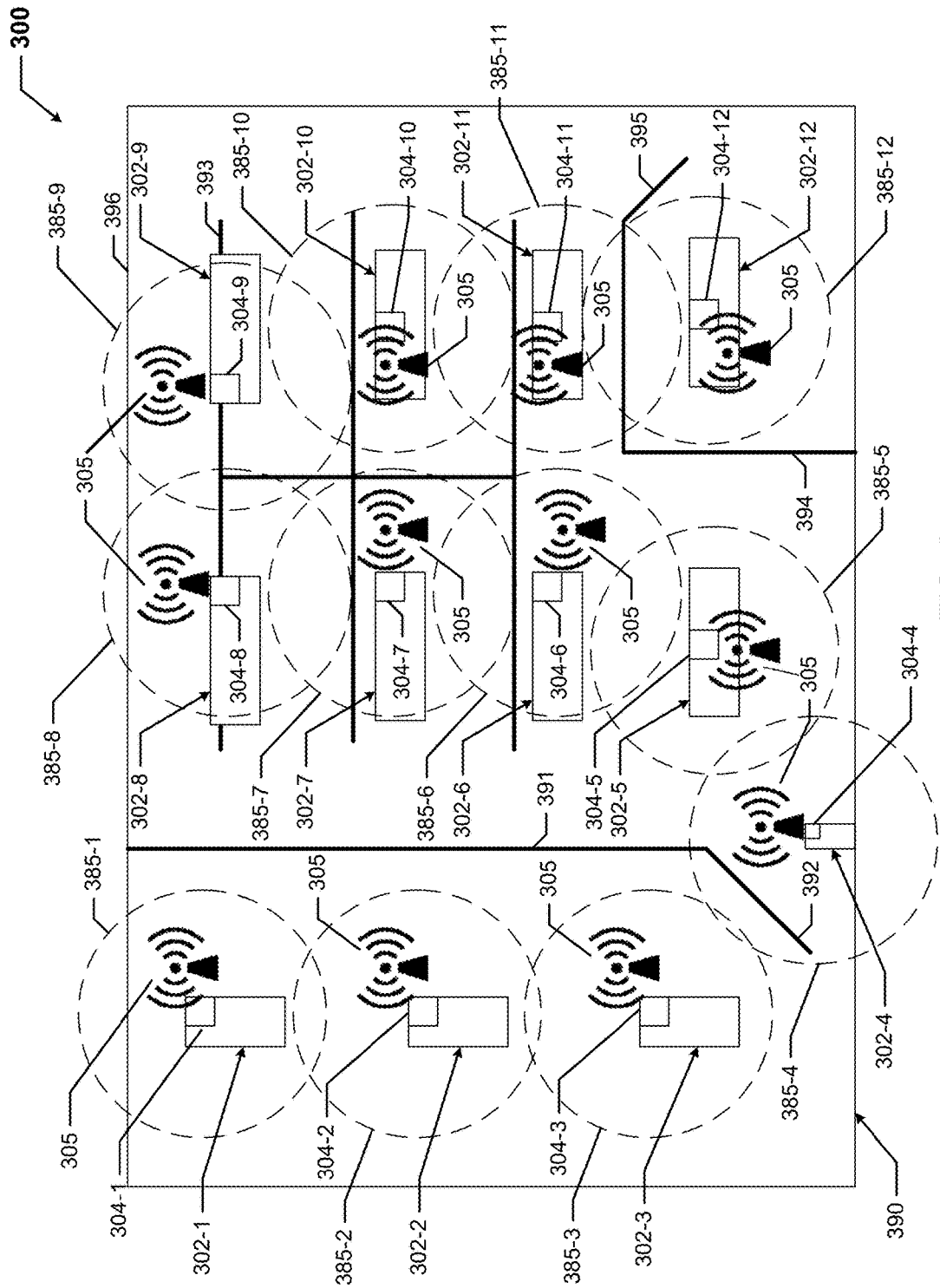
FIG. 3 shows a lighting system located in a volume of space in accordance with certain example embodiments.

FIG. 3 shows a lighting system 300 located in a volume of space 390 in accordance with certain example embodiments. Specifically, FIG. 3 shows a system 300 in which the various light fixtures 302 are auto-commissioned. Referring to FIGS. 1-3, the lighting system 300 of FIG. 3 includes twelve light fixtures 302, where each light fixture 302 of FIG. 3 is substantially similar to the light fixture 102-1 of FIG. 1 described above. Specifically, the lighting system 300 includes light fixture 302-1, light fixture 302-2, light fixture 302-3, light fixture 302-4, light fixture 302-5, light fixture 302-6, light fixture 302-7, light fixture 302-8, light fixture 302-9, light fixture 302-10, light fixture 302-11, and light fixture 302-12. In this case, light fixture 302-4 is an exit light, and the other 11 light fixtures 302 are troffer lights.

Each light fixture 302 in the light system 300 of FIG. 3 includes a communication system 304. Specifically, in this example, light fixture 302-1 includes communication system 304-1, light fixture 302-2 includes communication system 304-2, light fixture 302-3 includes communication system 304-3, light fixture 302-4 includes communication system 304-4, light fixture 302-5 includes communication system 304-5, light fixture 302-6 includes communication system 304-6, light fixture 302-7 includes communication system 304-7, light fixture 302-8 includes communication system 304-8, light fixture 302-9 includes communication system 304-9, light fixture 302-10 includes communication system 304-10, light fixture 302-11 includes communication system 304-11, and light fixture 302-12 includes communication system 304-12.

As shown in FIG. 3, the location of the communication system 304 on the light fixture 302 can vary. Further, each communication system 304 includes a transceiver (e.g., transceiver 124), and each transceiver in this example transmits and receives radio frequency waves. These radio frequency waves provide the communication links 305 by which the light fixtures 302 (and, more specifically, the communication systems 304) communicate with each other. Each transceiver of a communication system 304 has a range 385 (e.g., 10 meters) that defines a maximum area or volume of space 390 in which the transceiver can send and receive signals.

In this case, the transceiver of communication system 304-1 has range 385-1, the transceiver of communication system 304-2 has range 385-2, the transceiver of communication system 304-3 has range 385-3, the transceiver of communication system 304-4 has range 385-4, the transceiver of communication system 304-5 has range 385-5, the transceiver of communication system 304-6 has range 385-6, the transceiver of communication system 304-7 has range 385-7, the transceiver of communication system 304-8 has range 385-8, the transceiver of communication system 304-9 has range 385-9, the transceiver of communication system 304-10 has range 385-10, the transceiver of communication system 304-11 has range 385-11, and the transceiver of communication system 304-12 has range 385-12.

A transceiver of a communication system 304 of a light fixture can communicate with a transceiver of a communication system 304 of another light fixture 302 if the range 385 of one transceiver intersects with the range 385 of another transceiver. In this example, range 385-1 intersects range 385-2, which intersects range 385-3, which intersects range 385-4, which intersects range 385-5, which intersects range 385-6, which intersects range 385-7, which intersects range 385-8, which intersects range 385-9, which intersects range 385-10, which intersects range 385-11, which intersects range 385-12. In other words, the communication systems 304 of the light fixtures 302 of FIG. 3 are communicably coupled to each other in a daisy-chain configuration. In other embodiments, the range 385 of the transceiver of the communication system 304 of one light fixture 302 can intersect with more than two ranges 385 of the transceivers of the communication systems 304 of one or more other light fixture 302

The light fixtures 302 of the lighting system 300 of FIG. 3 are located within a volume of space 390. A volume of space 390 can be any interior and/or exterior space in which one or more light fixtures of a lighting system can be located. In this case, the volume of space 390 is part of an office space that is defined by exterior walls 396 that form the outer perimeter of the volume of space 390. The volume of space 390 is divided into a number of areas. For example, a wall 391 and a door 392 separate a hallway (in which light fixture 302-1, light fixture 302-2, and light fixture 302-3 are located) from a work space (in which the remainder of the light fixtures 302 are located). Light fixture 302-4, the exit sign, is located above the door 392 within the work space.

As another example, wall 394 and door 395 define an office (in which light fixture 302-12 is located) within the work space. Light fixture 302-4, light fixture 302-5, light fixture 302-6, light fixture 302-7, light fixture 302-8, light fixture 302-9, light fixture 302-10, and light fixture 302-11 are located within the work space outside of the office. In addition, a number of cubicle walls 393 are located within the work space outside of the office. The communication links 305, as in this case using the radio frequency waves, can be capable of having a range 385 that extend beyond a wall or other boundary within the volume of space 390.

In some cases, one or more items within the volume of space 390 (e.g., signs, ductwork, or other devices having reflective material) can be located within a range 385. Such devices can interfere with communications between light fixtures 302 by altering and/or redirecting the signals sent between light fixtures 302. To overcome this obstacle, example embodiments can utilize one or more methods. For example, as discussed above, example communication systems 304 can vary the frequencies of the signals (in this case, RF waves) that are sent.

The example the communication systems 304 of FIG. 3 can commission the light fixtures 302 of the system 300 in one or more of a number of ways. For example, assuming that each light fixture 302 has a unique identification number (part of the stored data 134), when an initiating signal (e.g., power, a request for identification) is initially provided to all light fixtures 302, the example communication system 304 of each light fixture 302 can broadcast its unique identification number over the communication links 305 (e.g., a radio channel of known frequency). In addition, the example communication system 304 of each light fixture 302 can initialize a table to record identification numbers of other light fixtures 302 in the system 300.

After a table is initially populated with identification numbers of adjacent light fixtures 302 (i.e., light fixtures whose ranges 385 intersect), subsequent communications can be broadcast by each light fixture 302 that includes the identification numbers of the adjacent light fixtures 302 and/or other information stored in the table of that light fixture 302. Under this scenario, the communication system 304 of each light fixture 302 can eventually have a table having the same information identifying all of the light fixtures 302 in the system 300.

At that point, the communication system 304 of each light fixture 302 can begin transmitting and receiving digital information packets, using the communication links 305, from the communication system 304 of other light fixtures 302 in the system 300 in a specific sequence. This sequence can be determined by an ordered ID vector that is stored as a protocol 132 in the storage repository 130 of each communication system 304. The communication system 304 of the light fixture 302 (e.g., light fixture 302-1) associated with the first identification number in the ordered ID vector can then transmit its identification number over the communication link 305. When the adjacent light fixture(s) 302 (e.g., light fixture 302-2) receive this message having the first identification number, the message can be relayed on to other light fixtures 302 until all light fixtures 302 in the system 300 have received the message having the first identification number.

At that point, the communication system 304 of the light fixture 302 (e.g., light fixture 302-2) associated with the second identification number in the ordered ID vector can transmit a response signal that includes its own identification number as well as the first identification number. This subsequent message can be received by the communication system 304 of the light fixture 302 associated with the first identification number. When this subsequent message is received by the first light fixture 302, the communication system 304 of the light fixture 302 associated with the first identification number records the time (using the timer 110) between sending the first message and receiving the subsequent message. An algorithm 133 can then be used to determine the distance between the light fixture 302 associated with the first identification number and the light fixture 302 associated with the second identification number. The time and/or distance information can be stored in the table.

For the light fixtures 302 that are not adjacent to the light fixture 302 associated with the first identification number, the amount of time it takes to send a response that is received by the communication system 304 of the light fixture 302 associated with the first identification number is increased. Eventually, reply messages from each of the other light fixtures 302 that have a different identification number than the first identification number are received by the communication system 304 of the light fixture 302 associated with the first identification number. The amount of time to receive each response is recorded, and the distance (defined by the path formed by each communication link 305 required to deliver the response) from the light fixture 302 associated with the first identification number to each of the other light fixtures 302 in the system is calculated and stored.

When a light fixture 302 (e.g., light fixture 302-1) is only within range of one other light fixture (e.g., light fixture 302-2) in the system 300, then the location of the light fixture 302 within the volume of space 390 can only be determined to a certain extent, and so may not be precise. If light fixture 302 (e.g., light fixture 302-8) is only within range of multiple other light fixtures (e.g., light fixture 302-7, light fixture 302-9) in the system 300, then the location of the light fixture 302 within the volume of space 390 can be determined with increased accuracy (e.g., the location of the light fixture 302 can be in three dimensions). In this latter case, the greater the number of light fixtures 302 (or other electrical devices) that are in direct communication with another light fixture 302 (or other electrical device), the location of the other light fixture 302 (or other electrical device) can be determined with greater accuracy.

The overlap of ranges 385 of the transceivers 124 can be altered by adjusting one or more of a number of factors. For example, the light fixtures 302 can be placed relatively close to each other. As another example, which can be in conjunction with or independent of the previous example, the range 385 of one or more transceivers 124 can be increased.

Once all responses to the message sent by the communication system 304 of the light fixture 302 associated with the first identification number in the ordered ID vector have been received, the process can be repeated by having the communication system 304 of the light fixture 302 associated with the second identification number in the ordered ID vector send a message, to which all of the other light fixtures 302 in the system 300 respond in a reply message that includes its identification number as well as the second identification number in the ordered ID vector. The process can again be repeated any of a number of additional times, such as once for each of the light fixtures 302 in the system 300.

In certain example embodiments, a communication system 304 can be placed on a wall (e.g., wall 391, wall 394, wall 396) or other object (e.g., cubicle wall 393) in the volume of space 390 to identify the location of those walls and/or other objects relative to the light fixtures 302 in the system 300. In such a case, each wall and/or other object would have a unique identification number, and can be used to provide definition (e.g., location of walls, distance between walls, position of doors, dimensions (e.g., length, width, height) of a room) to the volume of space 390.

When all of the iterations have been performed, one or more of the communication systems 304 can determine the location of each light fixture 302 (as well as walls and/or other objects within the volume of space 390 using the results of the algorithms 133 performed by the communication systems 304, as described in the previous paragraphs. Alternatively, the network manager 180 can determine the location of each light fixture 302 using the data in the tables of the communication systems 304. To determine the location of each light fixture 302, one or more algorithms 133 can be performed. For example, one or more algorithms 133 can effectively use a triangulation method to determine a location (e.g., x,y,z coordinates) of each light fixture 302 in the volume of space 390. In some cases, a location of at least one light fixture 302 and/or other object (e.g., a wall, a door) is known before the algorithms 133 are run to determine the location of all other light fixtures 302 and/or other objects in the volume of space 390.

When the location of all components (e.g., light fixtures 304, walls, doors, cubicles) in the volume of space 390 are determined using example embodiments, one or more of the communication systems 304 can go into "sleep" mode or completely shut down. In some cases, the procedure for identifying and determining the location of light fixtures and/or other components in a volume of space 390 can be re-run based on some factor (e.g., passage of time, instructions from a user, loss of power to a light fixture 302 in the system 300).

For example, if a new light fixture 302 is added a year after the system 300 of FIG. 3 is auto commissioned using example embodiments, then the exact location of the new light fixture 302 can be identified, and the new light fixture 302 can be automatically commissioned using example embodiments. Similarly, if a light fixture 302 is replaced with a replacement light fixture 302, then the exact location of the replacement light fixture 302 can be identified, and the replacement light fixture 302 can be automatically commissioned using example embodiments.

In certain example embodiments, the process described above (or other processes contemplated herein) can be used for other purposes aside from, or in addition to, commissioning light fixtures 302. For example, by using measurements taken by the sensors 160, example embodiments can determine whether a level of light directed to a particular location within the volume of space 390 is appropriate. For instance, if a level of light measured by a sensor 160 at a location where a work station is located is determined to be too low (relative to a threshold value (stored data 134)), an example communication system 304 can adjust the light output automatically by instructing the power supply 140 for that light fixture 302 to provide more output from the light sources 142. Alternatively, a communication system 304 can notify a user 150 or the network manager 180 of the low light condition at the location.

As another example, when a light fails, one or more example communication systems 304 can work in conjunction with one or more sensors 160 and/or one or more energy metering modules 111 to determine that a particular light fixture 302 has failed. Further, example embodiments, can notify a user 150 or the network manager 180 of the failed light fixture 302 and its location in the volume of space 390.

Figure 4:
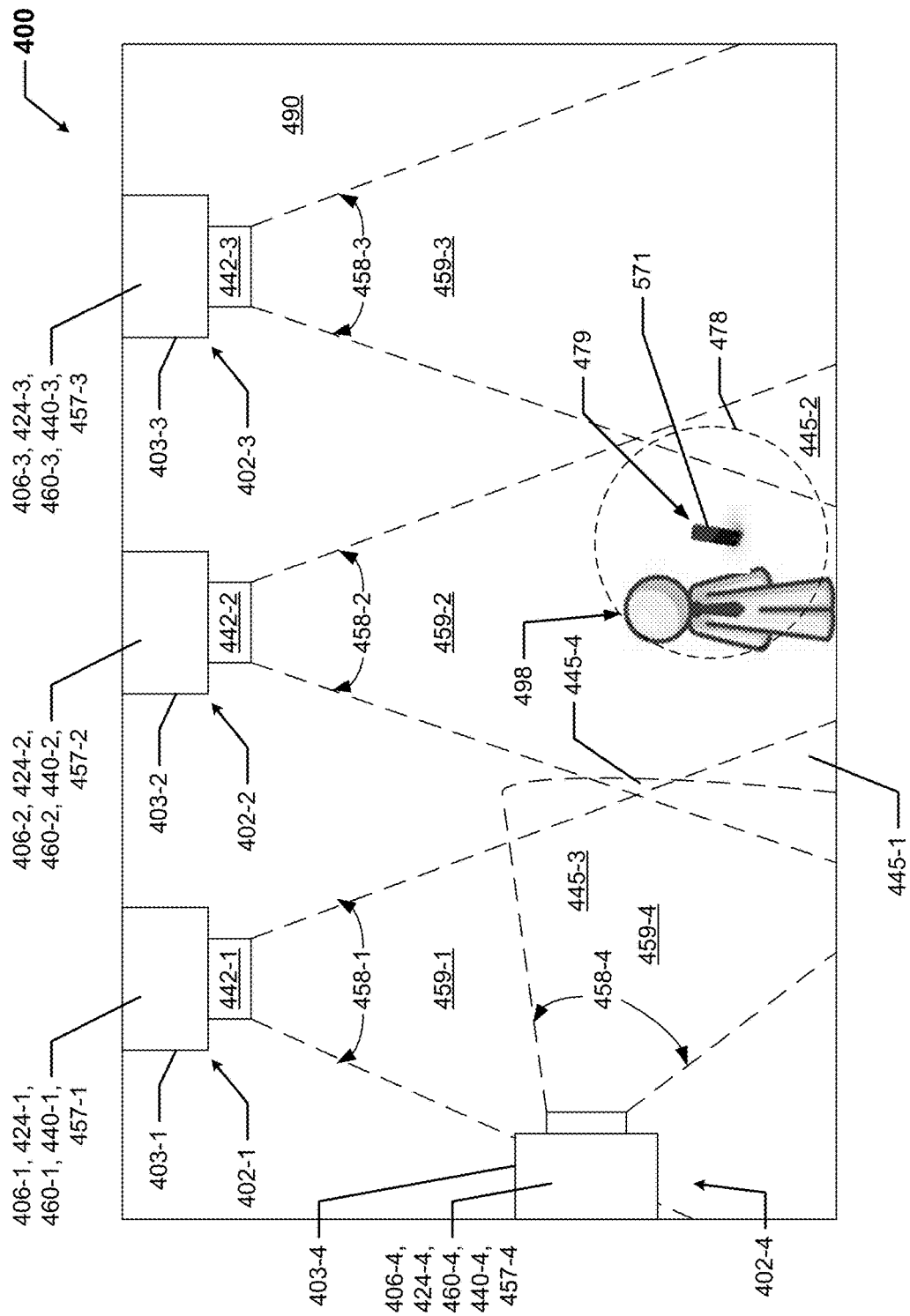
FIG. 4 shows another lighting system in a volume of space in accordance with certain example embodiments.

FIG. 4 shows a system 400 located in a volume of space 490 that communicates using VLC accordance with certain example embodiments. Referring to FIGS. 1-4, the system 400 of FIG. 4 includes a number (in this case, four) of light fixtures 402 (light fixture 402-1, light fixture 402-2, light fixture 402-3, and light fixture 402-4) and an asset 498. The example light fixtures 402 (including components thereof, such as the controller 406, the transceiver 424, the sensor 460 (in this case, a signal detector), the power supply 440, the modulation circuit 457, and the light source 442) of FIG. 4 can be substantially similar to the light fixture 102-1 (including corresponding components, such as the controller 106, the transceiver 124, the sensor 160 (e.g., a signal detector), the power supply 140, the modulation circuit 157, and the light source 142) described above with respect to FIG. 1. In this case, light fixture 402-1, light fixture 402-2, and light fixture 402-3 are hi-bay lights, and light fixture 402-4 is a wall light.

Light fixture 402-1 includes controller 406-1, transceiver 424-1, sensor 460-1, power supply 440-1, modulation circuit 457-1, and light source 442-1, all of which are disposed within or on the housing 403-1 of the light fixture 402-1. Light fixture 402-1 includes controller 406-2, transceiver 424-2, sensor 460-2, power supply 440-2, modulation circuit 457-2, and light source 442-2, all of which are disposed within or on the housing 403-2 of the light fixture 402-2. Light fixture 402-3 includes controller 406-3, transceiver 424-3, sensor 460-3, power supply 440-3, modulation circuit 457-3, and light source 442-3, all of which are disposed within or on the housing 403-1 of the light fixture 402-3. Light fixture 402-4 includes controller 406-4, transceiver 424-4, sensor 460-4, power supply 440-4, modulation circuit 457-4, and light source 442-4, all of which are disposed within or on the housing 403-1 of the light fixture 402-4.

Each light fixture 402 can be stationary or mobile. If a light fixture 402 moves, then the auto-commissioning function, as described above with respect to FIG. 3, can determine the precise location of the moved light fixture 402 in the volume of space 490. Similarly, if a light fixture 402 is added to the system 400, an auto-commissioning process incorporating the added light fixture 402 is automatically run, which means that auto-commissioning is a real-time plug-and-play process for any added, moved, and/or removed light fixtures 402 in the system 400.

A light source 442 of a light fixture 402 can, in certain circumstances and/or under certain conditions, illuminate. Alternatively, a light source 442 of a light fixture 402 can always be illuminated. A light source 442 of a light fixture 402 can enter one or more of a number of different modes of operation (e.g., flashing at constant and/or variable intervals, constantly on). A mode of operation of the light source 442 can change based on one or more of a number of events, including but not limited to the passage of time, a change in operation of an electrical device, and an emergency condition.

As the light source 442 of a light fixture 402 generates a light output 459, the light output 459 is directed away from the light fixture 402 in a certain pattern 458 (also called a line of sight 458). The line of sight 458 of the light output 459 can vary depending on one or more of a number of factors, including but not limited to characteristics, shape, and/or size of a lens, shape and/or size of a hood, and location of any obstacles outside the light fixture 402. Further, the light output 459 within the line of sight 458 can travel a certain distance, depending on the strength of the light source 442.

In addition, or in the alternative, a light source 442 of a light fixture 402 can emit other types of light that are outside of light that is visible to the human eye. For example, a light source 442 of a light fixture 402 can emit infrared (IR) signals using an IR source. In such a case, the transceiver of an asset 498 and/or an adjacent light fixture 402 can be capable of receiving the IR signal from the IR source (a light source 442) of the light fixture 402. Similarly, the controller 406 of the adjacent light fixture 402 can be capable of parsing the VLC signal from the IR signal. A light fixture 402 can emit such other types of light, for example, when the light source 442 is off.

In this example, light source 442-1 of light fixture 402-1 emits light output 459-1 in a line of sight 458-1. Light source 442-2 of light fixture 402-2 emits light output 459-2 in a line of sight 458-2. Light source 442-3 of light fixture 402-3 emits light output 459-3 in a line of sight 458-3. Light source 442-4 of light fixture 402-4 emits light output 459-4 in a line of sight 458-4. The line of sight 458-1 of light output 459-1 overlaps with the line of sight 458-2 of light output 459-2, intersecting at 445-1. The line of sight 458-2 of light output 459-2 overlaps with the line of sight 458-3 of light output 459-3, intersecting at 445-2. The line of sight 458-1 of light output 459-1 overlaps with the line of sight 458-4 of light output 459-4, intersecting at 445-3. The line of sight 458-2 of light output 459-2 overlaps with the line of sight 458-4 of light output 459-4, intersecting at 445-4.

Figure 5:
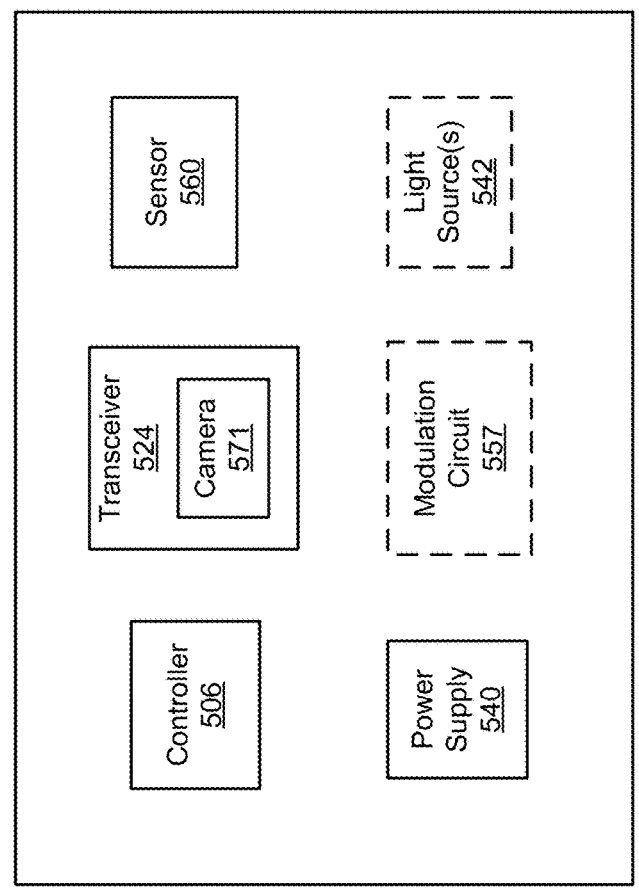
FIG. 5 shows a system diagram of a communication device in accordance with certain example embodiments.

The system 400 can include one or more assets 498. In this example, there is one asset 498. An asset 498 can include a communication device 479. Details of a communication device 479 is shown in FIG. 5. Essentially, the communication device 479 of an asset 498 can be substantially the same (or at least have some of the same components) as the communication system 104 of a FIG. 1, except that the communication device 479 may not also have a light source or a modulation circuit. If an asset 498 includes a light source (e.g., a display panel, an indicator light), then the asset 498 can be considered a type of light fixture 402, since the light source can be configured to send visible light signals to one or more light fixtures 402 in the system 400. In this case, the communication device 479 of the asset 498 of FIG. 4 includes a camera 571.

In certain example embodiments, the communication device 479 of an asset 498 has a line of sight 478 (also called a coverage pattern or a range). When the line of sight 478 of a communication device 479 of an asset 498 intersects with the line of sight 458 of the light output 459 of a light fixture 402 (in this case, line of sight 458-2 of the light output 459-2 of light fixture 402-2 and line of sight 458-3 of the light output 459-3 of light fixture 402-3), the communication device 479 can receive a VLC signal from (and in some cases send a VLC signal to) the light fixture 402 (in this case, light fixture 402-2 and/or light fixture 402-3).

Similarly, when the line of sight 458 of the light output 459 of a light fixture 402 intersects with the line of sight 458 of the light output 459 of another light fixture 402, as shown by area 445, those light fixtures 402 can communicate with each other using VLC signals. For example, as shown in FIG. 4, the line of sight 458-2 of the light output 459-2 of light fixture 402-2 intersects with the line of sight 458-3 of the light output 459-3 of light fixture 402-3, as shown by area 445-2. As a result, light fixture 402-2 and light fixture 402-3 can directly communicate with each other using VLC signals.

When the communication device 479 of an asset 498 communicates with a light fixture 402, the VLC signals can be used with one or more of a number of other technologies for communication. As one example, the VLC signals can be visible light in both directions (uplink from the communication device 479 to a light fixture 402 and down link from a light fixture 402 to the communication device 479) without the use of other communication technologies. As another example, the VLC signals can be transmitted using a VLC down link and an infrared uplink. As yet another example, the VLC signals can be transmitted using a VLC down link with a wireless uplink.

In addition, the transceiver 424 of a light fixture 402 can send the VLC signal to the modulation circuit 457 of the light fixture 4020. In such a case, the modulation circuit 457 of a light fixture 402 can generate, based on the VLC signal, a visible light signal that, along with the power signal generated by the power supply 440, is received by the light source 442 as an input signal. While the controller 406, the transceiver 424, the power supply 440, and the modulation circuit 457 are shown in FIG. 4 to be located inside the housing 403 of the light fixture 402, one or more of these components (or portions thereof or other components, such as the signal detector) can be located outside the housing 403 and remain operatively coupled to each of the other components of the light fixture 402.

Any number of light fixtures 402 can be included in an example system 400. Each light fixture 402 can be within a line of sight of at least one other light fixture 402 in the system 400. Alternatively, a light fixture 402 can be outside the "line of sight" of the other light fixtures 402 in the system 400 and still be able to communicate with one or more of those other light fixtures 402 using VLC signals. For example, a light fixture 402 can use some device or component (e.g., a fiber optic cable) to bridge the gap and overlap with the line of sight 458 for the light source 442 of an adjacent light fixture 402. For example, the distal end of a fiber optic cable can be exposed within the line of sight 458 for the light source 442 of a light fixture 402, which essentially extends the line of sight 458 of the light fixture 402 to include the distal end of the fiber optic cable.

In certain example embodiments, a light fixture 402 of the system 400 can be a base device. In some cases, the base device can represent an end point (e.g., beginning, end) in a daisy-chain of light fixtures 402 that transfer a VLC signal. In such a case, the base device can send a VLC signal to a translation module of the base device. In certain example embodiments, the translation module translates the VLC signal into a communication format.

Once in the translation module translates the VLC signal into the communication format, a communication module of the base device can send the VLC signal in the communication format. The communication module of the base device can be substantially similar to the communication module 108 described above with respect to FIG. 1. Further, the communication module of the base device can be communicably coupled to one or more network managers (e.g., server, computer, control panel, alarm panel, cell phone, loudspeaker, siren) using wired and/or wireless technology.

The volume of space 490 of the system 400 can be any area in which light fixtures 402 can be disposed. Examples of a volume of space 490 can include, but are not limited to, a room, a building, a warehouse, a factory, a store room, a parking lot, a parking garage, a store, and a plant. A volume of space 490 can be indoors and/or outdoors. A volume of space 490 can be subject to any of a number of conditions (e.g., excessive heat, excessive cold, high humidity, corrosion, marine, hazardous).

FIG. 5 shows a system diagram of the communication device 479 of FIG. 4 in accordance with certain example embodiments. A communication device 479 can receive, and in some cases send, signals. Referring to FIGS. 1-5, the communication device 479 can include a number of components. For example, as shown in FIG. 5, the communication device 479 can include a power supply 540, a sensor 560 (in this case, a signal detector), a transceiver 524, an optional modulation circuit 557, an optional light source 542, and a local controller 504. The communication device 479 can also include one or more other components, including but not limited to a communication module, a hardware processor, an application interface, a security module, and a timer. The components of the communication module 479 can be substantially the same as the corresponding components of the light fixture 102-1 described above with respect to FIG. 1, except as described below.

If the communication device 479 only receives, and does not transmit, signals, the transceiver 524 can be called a receiver. The transceiver 524 of the communication device 479 can be or include a camera 571 (similar to camera 171 of FIG. 1 above) in certain example embodiments. In such a case, the camera 571 of the transceiver 524 can receive and interpret a VLC signal sent by a light fixture. As explained above, when the light fixtures in a system are networked and communicate with each other, information about the system can be communicated to the communication device 479 in real time.

For example, during auto-commissioning of the light fixtures in a system, the various light fixtures (e.g., light fixtures 402) in the system (e.g., system 300) can be configured to communicate among themselves so that the location of each light fixture within a volume of space (e.g., volume of space 490) is known, independent of the communication device 479 of the asset 498. When the communication device 479 communicates with at least one communication system of a light fixture, the precise location of the corresponding asset can be precisely determined based on the precise known location of the light fixtures discovered during auto-commissioning.

As a specific example in this case, after the light fixtures have located themselves within a volume of space during auto-commissioning, when the transceiver 524 of the communication device 479 is a mobile phone with a camera 571, and when the asset is a person, the VLC signals sent to the communication device 479 of the asset can provide the asset with his/her location within the volume of space using her/his mobile phone. The positioning system relies on each light fixture broadcasting its unique ID in a VLC signal and the phone camera 571 receiving and interpreting each VLC signal. The phone camera 571 can determine the ID of each light fixture from the VLC signal based on one or more image frames. Therefore, this location information can be provided to an asset without surveying or indoor setup in order to be functional.

Example embodiments can be "plug-and-play". In other words, when light fixtures are installed in the volume of space, an asset can immediately obtain and/or provide location information with respect to the light fixtures without any initialization, additional equipment, or other setup procedures. If the communication device 479 is a smartphone (or other type of mobile device), an application ("app") on the smartphone can accesses various information with respect to the volume of space, including obtaining a building map (or map of some other applicable volume of space), locating itself on the map, providing landmarks on the map, and providing any warning/cut off areas that have been blocked, all of which can originate from the auto-commissioning process. The smartphone (communication device 479) can receive the map of the volume of space along with the location of light fixture IDs either from its remote data base or using WiFi. If the light fixtures are equipped with WiFi communication capabilities, this information can be passed from each light fixture to the smartphone using the WiFi or some other means of communication compatible with the smartphone.

In addition to providing information to an asset, location and/or identification information about the asset can also be obtained, as when the transceiver 524 of the communication device 479 is also capable of sending signals. Such information can be useful, for example, to understand foot flow traffic through a store, the location of people during an emergency, the location of a piece of equipment, how long a person stays in a volume of space, and how often a particular person visits a volume of space.

The communication device 479 can include a housing 503. Each of the components of the communication device 479 can be disposed within, on, or remotely from the housing 479. The communication device 479 can be (or be part of) a device that is disposed on an outer surface of an asset 498. For example, the communication device 479 can be, or can be embedded in, a name tag, hard hat, head lamp, a label, a sticker, or badge worn by a person (a type of asset 498). Alternatively, the communication device 479 can be worn on a belt or held in a hand of an asset.

Example embodiments can identify assets within a volume of space and determine the location of each asset within the volume of space based on results of an auto-commissioning process. In this way, example embodiments can be used to locate an asset using auto-commissioned light fixtures (and possibly other VLC devices) in the volume of space. This location information can be used for the benefit of the asset, a user, a network manager, a master controller, or any other suitable entity. Example embodiments can be used locate an asset that is stationary or moving within the volume of space over time. Example embodiments can save time and resources while efficiently and automatically locating one or more assets in a volume of space.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system for locating an asset, comprising:
   a first light fixture disposed in a volume of space and comprising a first transceiver, a first light source, and a first modulation circuit, wherein the first light source emits a first light output that defines a first line of sight, wherein the first modulation circuit generates and sends a first VLC signal that is part of the first light output;
   an auto-commissioning system communicably coupled to the first light fixture, wherein the auto-commissioning system comprises:
      a first memory for storing first instructions, first algorithms, and first protocols;
      a first hardware processor that executes the first instructions, the first algorithms, and the first protocols; and
      a first controller that auto-commissions, using the first instructions, the first algorithms, and the first protocols executing on the first hardware processor, the first light fixture, wherein commissioning the first light fixture comprises determining a first light fixture location of the first light fixture in the volume of space, wherein the first controller sends the first light fixture location to the first light fixture; and
   a communication device associated with the asset, wherein the asset is disposed in the volume of space, wherein the communication device is within the first line of sight of the first light output sent by the first light fixture at a first time, wherein the communication device comprises:
      a second transceiver;
      a second memory for storing second instructions, second algorithms, and second protocols;
      a second hardware processor that executes the second instructions, the second algorithms, and the second protocols; and
      a second controller, using the second instructions, the second algorithms, and the second protocols executing on the second hardware processor, that;
         receives, using the second transceiver, the first VLC signal from the first transceiver, wherein the first VLC signal comprises a first identification and the first light fixture location of the first light fixture in the volume of space; and
         determines, using the first light fixture location, an asset location of the asset in the volume of space.

2. The system of claim 1, further comprising:
   a second light fixture comprising a third transceiver, a second light source, and a second modulation circuit, wherein a second light fixture location of the second light fixture in the volume of space is previously determined by the first controller of the auto-commissioning system, wherein the second light source emits a second light output that defines a second line of sight, wherein the second modulation circuit generates and sends a second VLC signal that is part of the second light output, wherein the communication device is within the second line of sight of the second light output sent by the second light fixture, wherein the second transceiver receives the second VLC signal from the third transceiver, wherein the second VLC signal comprises a second identification and the second light fixture location of the second light fixture in the volume of space.

3. The system of claim 2, wherein the second light output is sent by the second light fixture at the first time.

4. The system of claim 2, wherein the second light output is sent by the second light fixture at a second time as the asset moves within the volume of space.

5. The system of claim 1, wherein the communication device comprises a camera, wherein the camera receives and interprets the first VLC signal.

6. The system of claim 5, wherein the first VLC signal provides the asset location within the volume of space relative to the first light fixture location.

7. The system of claim 6, wherein the first VLC signal further provides the asset location within the volume of space relative to a remainder of light fixture locations determined by the auto-commissioning system.

8. The system of claim 7, wherein the first VLC signal further provides a layout of all non-light fixture objects within the volume of space, wherein the layout of all non-light fixture objects is determined by the auto-commissioning system.

9. The system of claim 5, wherein the first VLC signal further provides additional information about the first light fixture.

10. The system of claim 5, wherein the camera is part of a mobile device.

11. The system of claim 1, wherein the communication device further comprises a second modulation circuit and a second light source, wherein the second light source emits a second light output that defines a second line of sight, wherein the second modulation circuit generates and sends a second VLC signal that is part of the second light output, wherein the first transceiver is within the second line of sight of the second light output sent by the communication device, wherein the first transceiver receives the second VLC signal from the second transceiver, wherein the second VLC signal comprises a second identification and a second location of the asset in the volume of space.

12. The system of claim 1, wherein the communication device is part of an identification card.

13. The system of claim 1, wherein the first light fixture comprises an exit sign.

14. The system of claim 1, wherein the first light fixture comprises a digital display on a control panel.

15. The system of claim 1, further comprising:
an additional communication device associated with an additional asset, wherein the additional asset is disposed in the volume of space, wherein the additional communication device comprises a third transceiver, wherein the additional communication device is within the first line of sight of the first light output sent by the first light fixture at a second time subsequent to the first time, wherein the third transceiver receives a second VLC signal from the first transceiver, wherein the second VLC signal comprises a first identification and the first light fixture location of the first light fixture in the volume of space.

16. The system of claim 15, wherein the second VLC signal further comprises the asset location of the asset in the volume of space at the second time.

17. A communication device of an asset located in a volume of space, the communication device comprising:
a transceiver for receiving a VLC signal from a light fixture in the volume of space;
a first memory for storing first instructions, first algorithms, and first protocols;
a first hardware processor for executing the first instructions, first algorithms, and first protocols;
a first controller communicably coupled to the transceiver and the first hardware processor; and
a sensor communicably coupled to the first controller, wherein the sensor detects the VLC signal sent by the light fixture,
wherein the communication device, when within a line of sight of light output sent by the light fixture, and using the first instructions, the first algorithms, and the first protocols executing on the first hardware processor:
receives, using the transceiver, the VLC signal from the light fixture, wherein the VLC signal comprises an identification and a light fixture location of the light fixture in the volume of space, wherein the identification and the light fixture location of the light fixture are previously determined during an auto-commissioning process; and
determines, using the first light fixture location, an asset location of the asset in the volume of space,
wherein the auto-commissioning process is performed by an auto-commissioning system communicably coupled to the light fixture, wherein the auto-commissioning system comprises:
a second memory for storing second instructions, second algorithms, and second protocols;
a second hardware processor that executes the second instructions, the second algorithms, and the second protocols; and
a second controller that auto-commissions, using the first instructions, the first algorithms, and the first protocols executing on the first hardware processor, the light fixture, wherein commissioning the light fixture comprises determining the light fixture location of the light fixture in the volume of space, wherein the second controller sends the light fixture location to the light fixture.

18. The communication device of claim 17, wherein the transceiver comprises a camera, wherein the camera captures the VLC signal sent by the light fixture.

19. The communication device of claim 17, further comprising:
a modulation circuit communicably coupled to the first controller; and
a light source coupled to the modulation circuit,
wherein the light source emits light that includes an additional VLC signal generated by the modulation circuit, wherein the additional VLC signal is received by the light fixture.

20. The communication device of claim 19, wherein the additional VLC signal comprises an asset identification and an asset location of the asset in the volume of space.

* * * * *